United States Patent [19]
Gistucci

[11] 3,984,503
[45] Oct. 5, 1976

[54] CARBURETORS

[75] Inventor: Paul Xavier Auguste Gistucci, Neuilly-sur-Seine, France

[73] Assignee: The Zenith Carburetor Company Limited, Stanmore, England

[22] Filed: June 13, 1973

[21] Appl. No.: 369,466

[52] U.S. Cl. .............................. 261/39 A; 261/44 R; 261/72 R; 261/DIG. 67
[51] Int. Cl.² ........................ F02M 3/06; F02M 9/06
[58] Field of Search ......... 261/DIG. 67, 39 A, 44 R, 261/72 R

[56] References Cited
UNITED STATES PATENTS

| | | | |
|---|---|---|---|
| 1,740,917 | 12/1929 | Beck | 261/DIG. 67 |
| 2,023,647 | 12/1935 | Schmid | 261/DIG. 67 |
| 2,216,677 | 10/1940 | Schuttler | 261/39 A |
| 2,230,159 | 1/1941 | Kratzer | 261/39 A |
| 2,291,048 | 7/1942 | Lichtenstein | 261/39 A |
| 2,557,111 | 6/1951 | Jorgensen et al. | 261/DIG. 67 |
| 3,011,770 | 12/1961 | Stoltman | 261/39 A |
| 3,285,585 | 11/1966 | Mennesson | 261/DIG. 67 |
| 3,368,326 | 2/1968 | Hervert | 261/DIG. 67 |
| 3,493,217 | 2/1970 | Farley | 261/44 R |
| 3,746,321 | 7/1973 | De Pontac | 261/50 A |
| 3,831,910 | 8/1974 | Shadbolt | 261/39 A |

FOREIGN PATENTS OR APPLICATIONS

| | | | |
|---|---|---|---|
| 109,099 | 8/1917 | United Kingdom | 261/39 A |
| 704,195 | 2/1954 | United Kingdom | 261/47 |

Primary Examiner—Tim R. Miles
Attorney, Agent, or Firm—Stevens, Davis, Miller & Mosher

[57] ABSTRACT

To provide a carburetor in which the fuel/air proportion in the mixture is maintained substantially constant despite variations in atmospheric pressure, supplementary air is supplied to the induction passage downstream of the throttle valve, in a fixed choke carburetor, or to the mixing chamber in an air valve carburetor, the supply of such supplementary air being controlled in accordance with atmospheric pressure.

8 Claims, 3 Drawing Figures

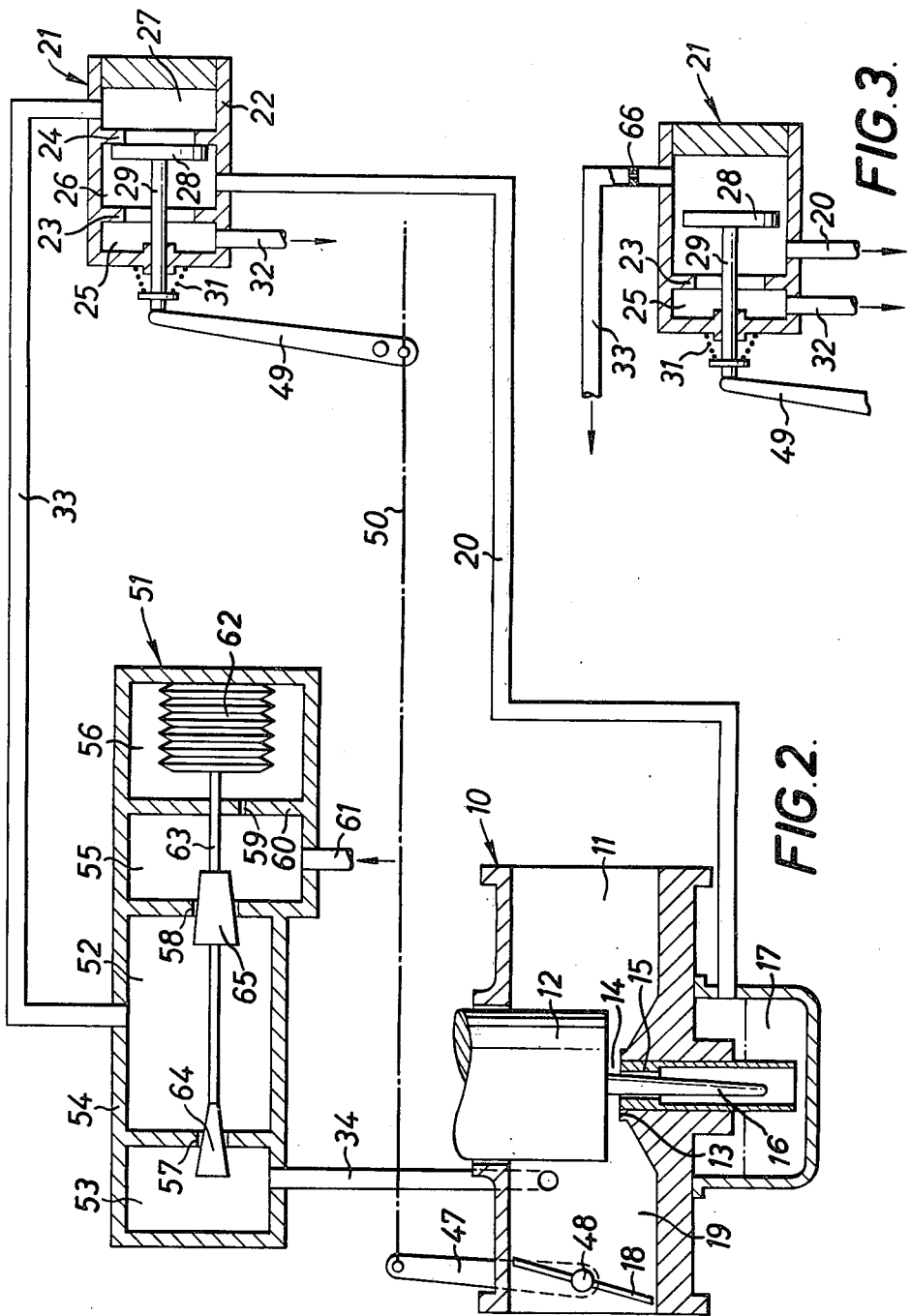

CARBURETORS

This invention relates to carburetor of the kind which comprise an induction passage with a mixing chamber therein, a valve at one end of said mixing chamber for controlling air flow through the induction passage and adapted to create a depression downstream of said valve at idling, and a fuel system for supplying fuel to the mixing chamber.

The mixture delivered by a carburetor will be richer at altitude than at sea level if no effort is made to compensate for change in atmospheric pressure. An object of this invention is to provide improved means for compensating for changes in atmospheric pressure which are effective at least during engine idling conditions.

According to one aspect of this invention there is provided a carburetor comprising an induction passage, a valve at one end of said mixing chamber for controlling air flow through the induction passage and adapted to create a depression downstream of the said valve at idling, and a fuel system for supplying fuel to the mixing chamber, wherein a supplementary air supply passage is connected to the induction passage downstream of said valve, and means responsive to atmospheric pressure control a variable flow restricting device in said supplementary air supply passage so that the supply of air through said supplementary air supply passage to said induction passage downstream of said valve is varied with changes in atmospheric pressure so as to maintain a substantially constant richness of the mixture at idling.

Preferably said valve is an air valve upstream of the throttle valve of the carburetor, the air valve co-operating with the wall of the induction passage to define a throat of variable area and being controlled by the depression established in that part of the induction passage between the throttle valve and the air valve in order to maintain that depression substantially constant during opening and closing of the air valve.

The fuel supply system may include a constant level fuel chamber for containing fuel to be supplied to the mixing chamber, and the carburetor may include a further valve which is associated with the throttle valve and which is arranged to connect said space in the fuel chamber to atmosphere when the throttle valve is closed and to the induction passage downstream of the first mentioned valve when the throttle valve is open.

According to another aspect of this invention there is provided an air valve carburetor comprising an induction passage, a throttle valve in said induction passage, an air valve upstream of the throttle valve, the air valve co-operating with the wall of the induction passage to define a throat of variable area and being controlled by the depression established in a mixing chamber which comprises that part of the induction passage between the throttle valve and the air valve in order to maintain that depression substantially constant during opening and closing of the air valve, a constant level fuel chamber for containing fuel to be supplied to the mixing chamber, a passage for connecting a space in the fuel chamber above the fuel level to atmosphere through a restricted vent and to a source of suction through a flow restricting device, means responsive to atmospheric pressure for controlling the relative flow capacity of said restricted vent and said flow restricting device, and a valve associated with the throttle valve, said valve being arranged to open an unrestricted vent which provides a connection of said space to atmosphere separate from the restricted vent when the throttle valve is moved to the closed position, wherein said means responsive to atmospheric pressure are arranged to control simultaneously the flow capacity of both said restricted vent and said flow restricting device, the respective degree of variation being such that the relative flow capacity is changed thereby.

The flow capacity of the restricted vent may be substantially greater at all times than the flow capacity of the flow restricting device, and the percentage variation of the flow capacity of the restricted vent, for a given change in atmospheric pressure, may be smaller than the variation of flow capacity of the flow restricting device. The flow capacity of both said restricted vent and said flow restricting device may be controlled by a common pressure responsive element which is housed in a chamber that is connected either to atmosphere or to the carburetor air intake. The pressure responsive element may be a partially-evacuated expansible bellows.

Conveniently said restricted vent is connected to the carburetor air intake.

Said valve which is associated with the throttle valve may be arranged to close the connection of said space to the restricted vent and the flow restricting device when opening said unrestricted vent. Alternatively said space may communicate with said restricted vent and said flow restricting device through said valve which is connected to said restricted vent and said flow restricting device through a restricted orifice.

Embodiments of this invention will be described now by way of example with reference to the accompanying drawings, of which:

FIG. 2 shows diagrammatically a carburetor of the air valve type embodying another form of this invention; and FIG. 3 shows a modification of the arrangement shown in FIG. 2.

Figure 1:
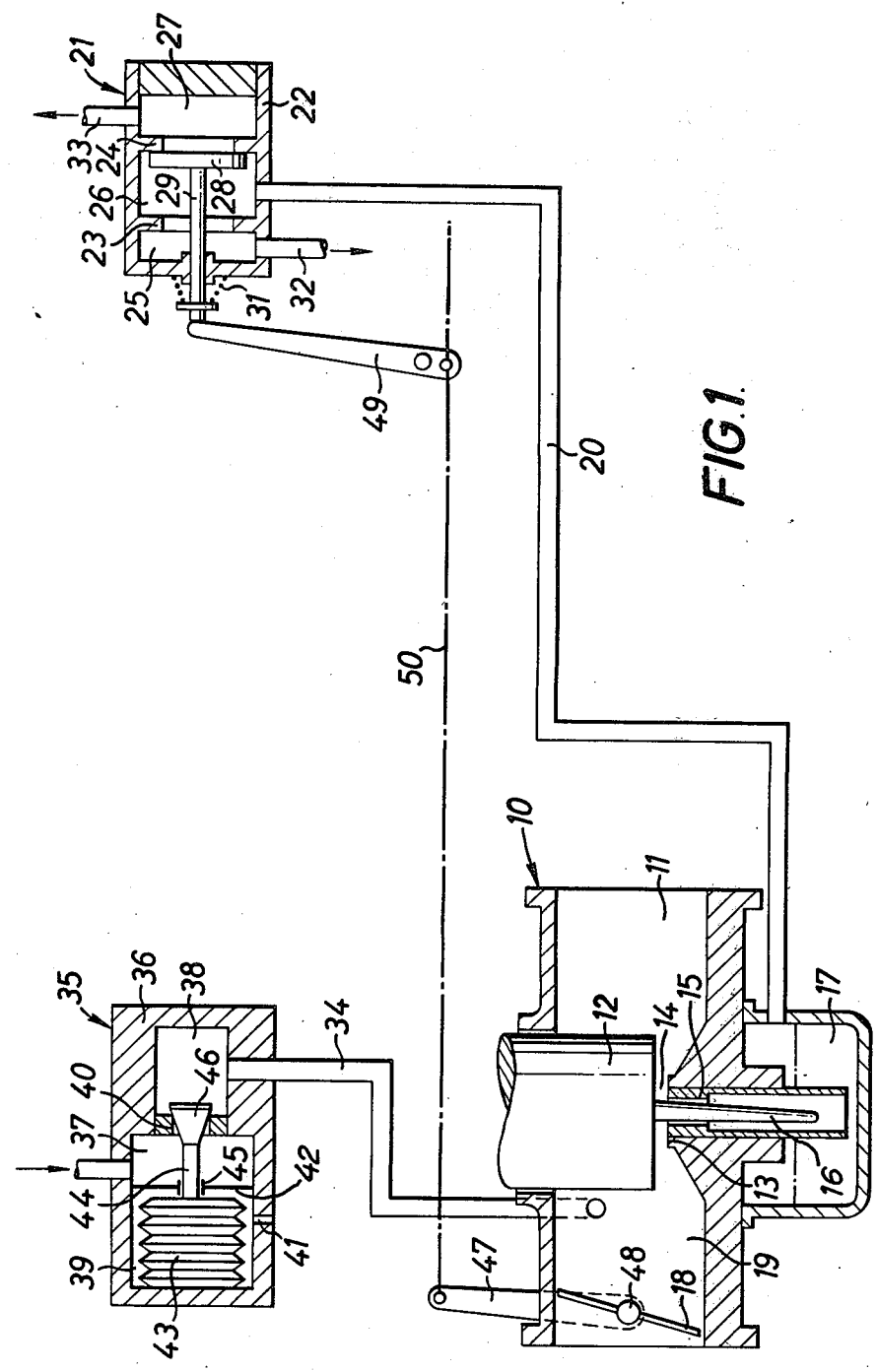
FIG. 1 shows diagrammatically a carburetor of the air valve type embodying one form of this invention.

Referring to FIG. 1 of the drawings, the carburetor comprises the usual body, part of which is shown at 10, in which body there is formed an induction passage 11. An air valve slide 12 co-operates with a bridge 13 in the induction passage 11 to define a variable area throat 14 into which opens a fuel supply jet 15 controlled by a profiled needle 16 carried by the air valve slide 12, the fuel supply jet 15 receiving fuel from a float chamber 17, the fuel level in which is maintained substantially constant by a float valve (not shown) admitting fuel thereto from a supply source. A throttle valve 18 is mounted in the induction passage 11 downstream of the air valve slide 12.

That part of the induction passage 11 between the air valve slide 12 and the throttle valve 18 comprises a mixing chamber 19. The position of the air valve slide 12 in the induction passage 11, and thus the dimensions of the throat 14, is controlled in the usual manner by the difference between atmospheric pressure and the depression in the mixing chamber 19 applied to opposite sides of a piston or diaphragm (not shown) to which the air valve slide 12 is connected.

The space in the float chamber 17 above the normal level of fuel therein is connected by a suitable passage or conduit 20 to a vent selector valve device 21 comprising a body 22 formed with a bore divided by two apertured partitions 23, 24 into three chambers, 25, 26 and 27 into the central one, 26, of which opens the passage or conduit 20. A valve member 28 in the chamber 26 is movable to and fro between the partitions 23 and 24 each of which provides a valve seat capable of being engaged by the valve member 28 to shut off the chamber 26 from the chambers 25 or 27 on the other side of that partition. The valve member 28 is carried by a stem 29 extending through the chamber 25 to the exterior of the body 22 and is acted upon by a spring 31 urging the valve member 28 towards the partition 23. The chamber 25 is connected by an unrestricted vent 32 to the atmosphere, and the chamber 27 is connected by a conduit 33 to the air intake (not shown) of the carburetor. The unrestricted vent 32 may be connected to atmosphere through a charcoal canister.

An air supply passage 34 is connected to the mixing chamber 19 and includes a variable flow restricting device 35 for controlling the supply of atmospheric air to the mixing chamber 19. The device 35 comprises a body 36 in which there is a chamber 37, a chamber 38 and a chamber 39, the two chambers 37 and 38 being connected by an orifice 40. The chamber 37 is connected to atmosphere and the chamber 38 is connected to the mixing chamber 19. The chamber 39 is connected either to atmosphere, to the air intake of the carburetor or to the mixing chamber 19 via a vent orifice 41, and is separated from the chamber 37 by a partition 42. A partially-evacuated expansible bellows device 43 is housed within the chamber 39 and carries a stem 44 which projects through a guide 45 in the partition 42. The stem 44 carries a frusto-conical profiled member 46 in the orifice 40. Thus, in the event of a change of pressure conditions in the chamber 39, the stem 44 is moved longitudinally by the bellows device 43 so that the effective area of the orifice 40 is varied by movement therein of the profiled member 46, the effective area of the orifice 40 being increased with expansion of the bellows device 43.

An arm 47 is fixed to the spindle 48 of the throttle valve 18 and is connected to one end of a lever 49 by any convenient form of linkage which is represented diagrammatically by the chain dotted line 50. The other end of the lever 49 is hinged to the stem 29. The arrangement of the arm 47, linkage 50 and lever 49 is such that, when the throttle valve 18 is closed, as is shown in FIG. 1, the valve member 28 is held against the partition 24 so that the passage 20 places the fuel chamber 17 in communication with the unrestricted vent 32 to atmosphere and blocks communication between the passage 20 and the conduit 33 leading to the carburetor air intake; whereas, when the throttle valve 18 is opened, the valve member 28 is moved from engagement with the partition 24 into contact with the partition 23 so that communication between the passage 20 and the conduit 33 is established and communication between the passage 20 and the unrestricted vent 32 is blocked. Thus, when the throttle valve 18 is closed the float chamber 17 is vented to atmosphere, whereas when the throttle valve 18 is open the space above the fuel in the float chamber 17 is vented to the carburetor air intake. It will be appreciated that, when the throttle valve 18 is open and the space above the fuel in the float chamber 17 is vented to the carburetor air intake, fumes in that space are drawn into the induction passage 11 via the conduit 33 and the carburetor air intake.

During engine idling conditions the throttle valve 18 is closed. The quantity of air flowing through the throat 14 into the mixing chamber is at the minimum. Air is drawn through the auxiliary air supply passage 34 by the depression in the mixing chamber 19 and the quantity depends upon the effective area of the orifice 40. It will be appreciated that the higher the altitude, the larger the area of the orifice 40 and the greater the quantity of air drawn into the mixing chamber 19. Two factors which vary with changes in atmospheric pressure influence the position relative to the bridge 13 which the air valve slide 12 adopts during engine idling conditions. Firstly, as atmospheric pressure decreases, the density of air in the throat 14 decreases, so that the air pressure loading on the air valve slide 12 is reduced. Secondly, as more air is drawn into the mixing chamber 19 with decrease in atmospheric pressure, there is a tendency for the depression in the mixing chamber 19 to increase so that the pressure differential, which controls the position of the air valve slide 12 relative to the bridge 13 tends to be reduced. In consequence of both these factors, as atmospheric pressure reduces, the air valve slide 12 moves nearer to the bridge 13, until equilibrium conditions are regained. The profiled needle 16 moves with the air valve slide 12 so that the effective area of the fuel metering orifice is reduced. The velocity of air flow through the throat 14 does not change with changes in atmospheric pressure during engine idling conditions so that the quantity of fuel drawn into the throat 14 is reduced with the reduction in the effective area of the fuel metering orifice that follows a decrease in atmospheric pressure. Thus it will be understood that, during engine idling conditions, the quantity of fuel supplied to the mixing chamber 19 is reduced and the quantity of air supplied to the mixing chamber is increased with a decrease in atmospheric pressure so that the tendency for the carburetor to deliver to richer mixture at altitude than at sea level is countered.

A considerably greater quantity of air flows through the throat 14 into the mixing chamber 19 when the throttle valve 18 is open than when the throttle valve 18 is closed. Thus, when the throttle valve 18 is open, the variation in the mass of air drawn into the mixing chamber 19 via the auxiliary air supply passage 34 with changes in altitude has a negligible effect upon the mixture delivered by the carburetor.

Referring now to FIG. 2, there is illustrated a carburetor which is provided with means which operate to compensate for changes in altitude when the throttle valve 18 is open as well as when it is closed. Many of the parts of the arrangement shown in FIG. 2 are identical to corresponding parts of the arrangement described above with reference to FIG. 1. These parts have been given the same references as are used in FIG. 1 and will not be described again in detail. The arrangement shown in FIG. 2 differs from that described above with reference to FIG. 1 in that the variable flow restricting device 35 is replaced by a pressure controlled flow regulating device 51. The conduit 33 of the vent selector valve 21 and the auxiliary air supply passage 34 are connected respectively to a chamber 52 and a chamber 53 in the pressure controlled flow regulating device 51.

The pressure controlled flow regulating device 51 comprises a body 54 in which there are two further chambers 55 and 56 in addition to the chambers 52 and 53. The two chambers 52 and 53 are connected by an orifice 57. The two chambers 52 and 55 are connected by an orifice 58. The two chambers 55 and 56 are connected by a restricted orifice 59 in a partition 60.

The chamber 55 is connected by a vent orifice 61 to the air intake of the carburetor.

The pressure controlled flow regulating device 51 also includes a manometric capsule 62 which is housed in the chamber 56 and which comprises a partially-evacuated expansible bellows device. A stem 63 connected to the manometric capsule 62 so as to be moved longitudinally by the action of changes of atmospheric pressure on the capsule 62 passes through the partition 60 and carries two profiled members 64 and 65 which, on the occurrence of such longitudinal movement, vary respectively the areas of the orifice 57 and the orifice 58. The relative areas of the orifices 57 and 58 and of the profiled members 64 and 65 are such that the effective area of the orifice 58 is at all times greater than the effective area of the orifice 57, and a given movement of the stem 63 causes the effective areas of both orifices 57 and 58 either to increase with an increase in altitude, or to decrease with a reduction in altitude the rate of change of the effective area of the orifice 58 being smaller than the rate of change of the effective area of the orifice 57.

Operation of the vent selector valve device 21 is the same as is described above with reference to FIG. 1. Thus when the throttle valve 18 is closed the float chamber 17 is connected to the unrestricted vent 32, so that fuel vapour formed due to high temperature conditions which may occur during idling can escape and is not drawn into the engine to produce an excessively rich mixture, nor does it build up a vapour pressure in the float chamber 17 sufficient to cause fuel spillage through the supply jet 15 and cause hot starting difficulty.

Air is drawn from the carburetor air intake into the mixing chamber 19 through the vent orifice 61, and the variable orifices 57 and 58. The pressure in the chamber 53 is substantially the same as that in the mixing chamber 19. The pressure in the chamber 55 is substantially atmospheric. The pressure in the chamber 52 is less than atmospheric, by an amount which depends upon the size of the variable area orifice 58, and is greater than the pressure in the mixing chamber 19 by an amount which depends upon the size of the variable area orifice 57.

Thus when the throttle valve 18 is closed and the float chamber 17 is connected to the unrestricted vent 32, the flow of air to the mixing chamber 19 depends upon the size of the smaller variable area orifice 57, the influence of the larger variable area orifice 58 being negligible, and consequently varies with changes in ambient atmospheric pressure, due to the action of the manometric capsule 62 which varies the area of the orifices 57 and 58 with changes in altitude.

When the throttle valve 18 is opened and the float chamber 17 is connected to the chamber 52, the pressure in the float chamber 17 is reduced to that which exists in the chamber 52 and which is higher than the pressure in the mixing chamber 19. The pressure in the chamber 52 depends upon the size of the orifices 57 and 58 and varies with changes in altitude due to the resultant movement of the stem 63. The conditions in the carburetor throat and consequently the rate of fuel supply through the orifice 15, tend to vary with the ambient atmospheric pressure, but the variation of air pressure in the float chamber 17 can be arranged to compensate for the effect of said conditions in the carburetor throat on the fuel supply.

Use of a variable orifice 58 in place of a fixed restricted orifice provides a more effective compensation for atmospheric pressure variations during idling since the profiled member 64 can be calibrated specifically to control the flow of air into the mixing chamber 19 when the unrestricted vent 32 is open and thus any desired characteristics can be obtained.

Referring to FIG. 3, the partition 24 may be omitted from the vent selector valve 21 of the arrangement described above with reference to FIG. 2, in which case a restricted orifice 66 would be provided in the conduit 33.

Various other modifications may be incorporated. For example, the vent orifice 61 may be connected direct to atmosphere. The chamber 56 may be connected directly to atmosphere, to the mixing chamber or to the carburetor air intake instead of being connected through the chamber 55 as illustrated in FIG. 2. The profiled members 64 and 65 may be controlled by respective ones of two manometric capsules in place of the common capsule 62 described and illustrated. The vent selector valve 21 may be replaced by two separate valves which respectively control the apertures in the partitions 23 and 24 and which are both connected operatively to the throttle valve.

The invention may also be applied to a fixed choke carburetor in order to maintain a substantially constant richness of the mixture at idling. In such an application of the invention, the supplementary air supply passage would be connected to the induction passage downstream of the throttle valve and a pressure regulator would be included in the supplementary air supply passage between the variable flow restricting device and the induction passage.

It will be appreciated that the apparatus described above with reference to the accompanying drawings is effective to counter any tendency for the carburetor to deliver a richer mixture with a decrease in atmospheric pressure only within the range of atmospheric pressures for which the partially-evacuated expandible bellows device is designed to operate.

I claim:

1. An air valve carburetor comprising an induction passage, a throttle valve in said induction passage, an air valve upstream of the throttle valve, the air valve co-operating with the wall of the induction passage to define a throat of variable area and being controlled by the depression established in a mixing chamber which comprises that part of the induction passage between the throttle valve and the air valve in order to maintain that depression substantially constant during opening and closing of the air valve, a constant level fuel chamber for containing fuel to be supplied to the mixing chamber, a passage for connecting a space in the fuel chamber above the fuel level to atmosphere through a restricted vent and to a source of suction through a flow restricting device, means responsive to atmospheric pressure for controlling the relative flow capacity of said restricted vent and said flow restricting device, and a valve associated with the throttle valve, said valve being arranged to open an unrestricted vent which provides a connection of said space to atmosphere separate from the restricted vent when the throttle valve is moved to the closed position, wherein said means responsive to atmospheric pressure are arranged to control simultaneously the flow capacity of both said restricted vent and said flow restricting device, the respective degree of variation being such that the relative flow capacity is changed thereby.

2. A carburetor as claimed in claim 1, wherein the flow capacity of the restricted vent is substantially greater at all times than the flow capacity of the flow restricting device.

3. A carburetor as claimed in claim 1, wherein the percentage variation of the flow capacity of the restricted vent, for a given change in atmospheric pressure, is smaller than the percentage variation of flow capacity of the flow restricting device.

4. An air valve carburetor as claimed in claim 1, wherein the flow capacity of both said restricted vent and said flow restricting device is controlled by a common pressure responsive element which is housed in a chamber and is connected either to atmosphere or to the carburetor air intake.

5. An air valve carburetor as claimed in claim 4, wherein the pressure responsive element is a partially-evacuated expansible bellows.

6. An air valve carburetor as claimed in claim 1, wherein said restricted vent is connected to the carburetor air intake.

7. An air valve carburetor a claimed in claim 1, wherein said valve which is associated with the throttle valve is arranged to close the connection of said space to the restricted vent and the flow restricting device when opening said unrestricted vent.

8. An air valve carburetor as claimed in claim 1, wherein said space communicates with said restricted vent and said flow restricting device through said valve which is connected to said restricted vent and said flow restricting device through a restricted orifice.

* * * * *